(12) United States Patent
Li

(10) Patent No.: US 6,700,767 B1
(45) Date of Patent: Mar. 2, 2004

(54) TEMPERATURE-BASED COOLING FAN CONTROLLING STRUCTURE

(75) Inventor: Nien-Lun Li, Hsinchuang (TW)

(73) Assignee: Taiwan Da-Long Industrial CO, Ltd., Taipei Hsien (TW)

( * ) Notice: Subject to any disclaimer, the term of this patent is extended or adjusted under 35 U.S.C. 154(b) by 0 days.

(21) Appl. No.: 09/560,178

(22) Filed: Apr. 28, 2000

(51) Int. Cl.$^7$ .............................. H01H 47/26; H02P 6/08
(52) U.S. Cl. ....................... 361/103; 361/165; 318/268
(58) Field of Search ................................. 361/103, 106, 361/143, 147, 152, 93.1, 93.8, 160, 161, 165; 318/268, 439

(56) References Cited

U.S. PATENT DOCUMENTS

| 4,832,576 A | * | 5/1989 | Deguchi et al. | ............... 417/45 |
| 5,718,373 A | * | 2/1998 | Kim et al. | ................... 236/35 |
| 5,942,866 A | * | 8/1999 | Hsieh | .......................... 318/268 |
| 6,054,824 A | * | 4/2000 | Hsieh | .......................... 318/445 |
| 6,182,902 B1 | * | 2/2001 | Shih | ............................. 236/35 |

* cited by examiner

*Primary Examiner*—Kim Huynh
(74) *Attorney, Agent, or Firm*—Dennison, Schultz & Dougherty

(57) ABSTRACT

Temperature-based cooling fan control structure mainly including a thermistor for measuring ambient temperature, a voltage amplification system to indicate voltage needed for the cooling fan to rotate under the measured temperature, a magnetic induction system, a rotating speed control system for adjusting the fan rotating speed, a timing trigger capacitor periodically actuating the cooling fan to rotate when the fan is temporarily stopped under an external force, a rectification system protecting all elements in the control structure against damage due to extreme changes in voltage and current, and a voltage-stabilizing control system reducing electromagnetic noise produced in the magnetic induction system.

7 Claims, 2 Drawing Sheets

FIG · 1

TEMPERATURE-BASED COOLING FAN CONTROLLING STRUCTURE

FIELD OF THE INVENTION

The present invention relates to a temperature-based cooling fan control system, and more particularly to a cooling fan control system that includes a thermistor, a voltage amplification system, a rotating speed control system, and means for setting rotating speed to compare a voltage needed by a basic rotating speed with an amplified voltage and thereby adjust fan rotating speed. The control structure also includes a timing trigger capacitor to periodically actuate the cooling fan when the fan is temporarily stopped under an external force.

BACKGROUND OF THE INVENTION

FIG. 1 illustrates a circuit diagram of a conventional cooling fan. As shown, the circuit includes a magnetic induction device 1' that receives bias voltage supplied by a voltage source Vcc via a bias resistor R1'. A permanent magnet is included in the magnetic induction device 1'. By means of polar changes over single magnetic pole (N and S pole), current is caused to pass coils L1' and L2'. A forward diode D1' is connected to the voltage source Vcc to avoid internal elements of the cooling fan from burning out. With these arrangements, the fan rotates at a fixed speed and is not changed by any factor. Current keeps flowing through coils L1' and L2' even when the cooling fan is temporarily stopped. Furthermore, two zener diodes D3' and D4' are connected to outputs of coils L1' and L2', respectively, to stabilize and control voltage, so that the fan rotates at a fixed voltage value to avoid or reduce electromagnetic noise.

Following disadvantages are found in the above-described conventional cooling fan:

(1) The fan rotating speed can not be adjusted in response to changes in ambient temperature.

(2) Current keeps flowing through coils when the fan is temporarily stopped and internal elements thereof tend to burn out.

(3) Polar changes over single pole cause the fan to always rotate at a fixed speed.

SUMMARY OF THE INVENTION

It is therefore a primary object of the present invention to provide a structure that uses temperature to control a cooling fan. A thermistor is included in the control structure to measure ambient temperature for use as a basis to adjust a terminal voltage, and a voltage amplification system amplifies the terminal voltage and transmits the amplified voltage to a rotating speed control system. The present invention also includes a magnetic induction system to provide multiple magnetic pole pairs, so that repulsion between similar magnetic poles transmits a signal to the rotating speed control system. The rotating speed control system compares a voltage needed by a basic rotating speed as set by a rotating speed setting means with the amplified voltage, in order to change the fan rotating speed.

Another object of the present invention is to provide the above cooling fan control structure in which a timing trigger capacitor is connected to the rotating speed control system, so that the fan in a temporarily stopped state under an external force can be periodically actuated by the timing trigger capacitor to rotate and diffuse heat.

It is known a thermistor generates a negative resistance against ambient temperature. The thermistor included in the cooling fan control structure of the present invention measures temperature a t the end of the thermistor and a terminal voltage thereof is adjusted according to the measured temperature. The adjusted terminal voltage is amplified by the voltage amplification system according to a set voltage amplifying degree and the amplified voltage is transmitted to the rotating speed control system. Meanwhile, an induction signal indicating repulsion between two similar magnetic poles in the magnetic induction system is also transmitted to the rotating speed control system. The rotating speed control system compares a voltage needed by a basic rotating speed as set by the rotating speed setting means with the amplified voltage, so that current flowing through coils can be adjusted according to the measured temperature to cause the cooling fan to rotate at variable speed. In the event the fan is temporarily stopped under an external force, the timing trigger capacitor may periodically actuate the fan to rotate at set intervals.

BRIEF DESCRIPTION OF THE DRAWINGS

The above and other objects of the present invention as well as the features and functions thereof can be best understood by referring to the following detailed description of the preferred embodiments and the accompanying drawings, wherein.

DETAILED DESCRIPTION OF THE PREFERRED EMBODIMENTS

Figure 1:
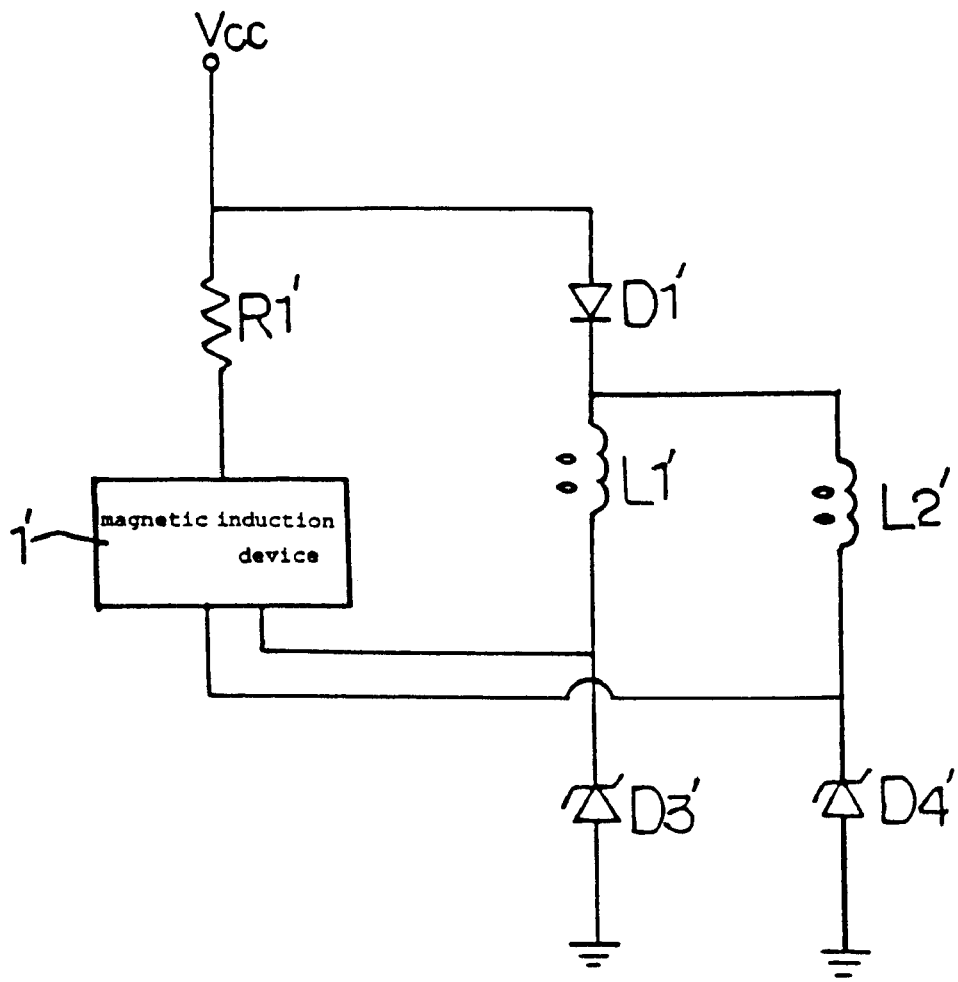
FIG. 1 is a circuit diagram of a conventional cooling fan.
Figure 2:
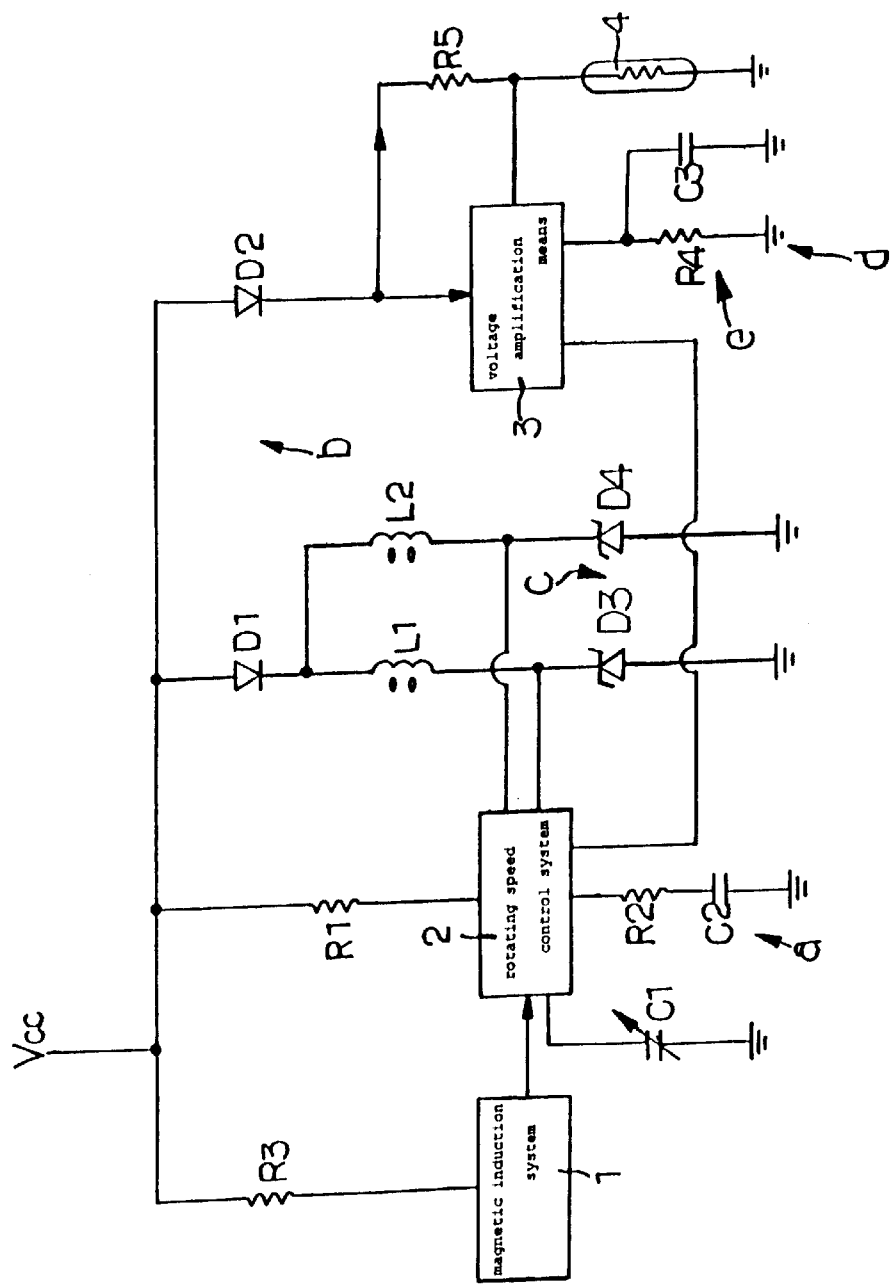
FIG. 2 is a circuit diagram of a cooling fan control structure according to a preferred embodiment of the present invention.

Please refer to FIG. 2 in which a circuit diagram of a cooling fan control structure according to a preferred embodiment of the present invention is shown. As shown, the cooling fan control structure mainly includes a magnetic induction system 1, a rotating speed control system 2, means 3 for amplifying voltage, a thermistor 4, means a for setting rotating speed, a rectification system b, a voltage-stabilizing control system c, a timing trigger capacitor C1, a voltage amplification system d, means e for setting voltage amplifying degree, and bias resistances R1, R3, and R5.

Current from a power source Vcc flows through bias resistances R3, R1, and R5 to supply bias voltage to the magnetic induction system 1, the rotating speed control system 2, and the thermistor 4, respectively.

In the magnetic induction system 1, a magnetic induction effect is produced to form multiple magnetic pole pairs (N and S poles) and quick polar changes are allowed over these poles. By means of repulsion between two similar magnetic poles, the fan keeps rotating in one direction. Meanwhile, signals indicating such magnetic induction and repulsion are transmitted to the rotating speed control system 2.

The voltage amplification system d is mainly composed of the voltage amplification means 3 and the voltage amplifying degree setting means e that is composed of a voltage amplifying degree setting capacitor C3 and a voltage amplifying degree setting resistance R4. The thermistor 4 measures ambient temperature at the end of the thermistor 4 and accordingly adjusts a terminal voltage thereof. The adjusted terminal voltage is transmitted to the voltage amplification system d and is amplified there according to an amplifying degree set by the voltage amplifying degree setting means e. The amplified terminal voltage is then transmitted to the rotating speed control system 2. The adjustment of terminal voltage according to the ambient temperatures measured by the thermistor 4 and the amplification of the adjusted terminal voltages by the voltage amplification system d according to the set amplifying degree is a first characteristic of the present invention.

The rotating speed control system 2 receives magnetic induction and repulsion signals sent by the magnetic induction system 1, as well as the amplified voltages transmitted by the voltage amplification system d. Means a for setting rotating speed is composed of a rotating speed control resistance R2 and a rotating speed control capacitor C2. The rotating speed control system 2 compares a voltage needed by a basic or minimum rotating speed set by means a with the amplified voltage and adjusts the current flowing through coils L1 and L2 according to a result from the comparison, so that the cooling fan rotates at a speed in response to the measured temperature. Meanwhile, the fan keeps rotating in the same direction under the magnetic induction and repulsion provided by the magnetic induction system 1. In the event the fan is temporarily stopped due to an external force, the timing trigger capacitor C1, which is a variable capacitor and can adjust its interval of trigger, will trigger periodically to cause the cooling fan to rotate and diffuse heat. The comparison of a voltage needed by a basic rotating speed with an amplified voltage made by the rotating speed control system 2 to allow adjustment of fan rotating speed, the reduction of current to zero when the cooling fan is stopped under external force, and the periodical triggering of the timing trigger capacitor C1 to rotate the fan in a temporarily stopped state under an external force, is another characteristic of the present invention.

The rectification system b is composed of two forward diodes D1 and D2 to prevent extreme changes in voltage or current between two electrodes so that coils L1 and L2, the voltage amplification system d, and the thermistor 4 can be protected against burning out.

The voltage-stabilizing control system c is composed of two zener diodes D3 and D4 for controlling and stabilizing the voltage to a fixed valve, in order to prevent electromagnetic noise during quick polar changes in the magnetic induction system 1.

With the above arrangements, the present invention not only allows a fan to provide general cooing effect but also has following advantages:

(1) The thermistor 4 and the voltage amplification system d together output signals to the rotating speed control system 2 to indicate voltage amplification according to measured ambient temperature; and the rotating speed control system 2 compares the voltage needed by a basic rotating speed with the amplified voltage to decide adjustment of the fan rotating speed according to the measured temperature.

(2) The timing trigger capacitor C1 periodically actuates the cooling fan to rotate at fixed intervals when the fan is temporarily stopped under an external force.

What is to be noted is the form of the present invention shown and disclosed is to be taken as a preferred embodiment of the invention and that various changes in the shape, size, and arrangements of parts may be resorted to without departing from the spirit of the invention or the scope of the subjoined claims.

What is claimed is:

1. A temperature-based cooling fan control structure comprising:

a magnetic induction system in which magnetic induction effect is produced to form multiple magnetic pole pairs (N and S poles) and quick polar changes are allowed over these magnetic pole pairs, such that a cooling fan operating under said control structure keeps rotating in one direction under magnetic repulsion;

a thermistor which measures ambient temperature and adjusts a terminal voltage thereof according to the measure temperature;

a voltage amplification system which sets a voltage amplifying degree for said terminal voltage and amplifies said terminal voltage according to said set voltage amplifying degree;

a rotating speed control system which receives magnetic induction and repulsion signals sent by said magnetic induction system and voltage amplification signals sent by said voltage amplification system to adjust rotating speed of said cooling fan;

means for setting fan rotating speed which sets a voltage needed by a basic rotating speed of said cooling fan for said rotating speed control system to compare said basic voltage with said terminal voltage amplified by said voltage amplification system, so that a result from said comparison is used by said rotating speed control system to adjust fan rotating speed; and a timing trigger capacitor which periodically actuates said cooling fan to rotate and diffuse heat when said cooling fan is temporarily stopped under an external force.

2. A temperature-based cooling fan control structure as claimed in claim 1, wherein said voltage amplification system further comprises:

means for setting voltage amplifying degree composed of a voltage amplifying degree capacitor and a voltage amplifying degree resistor for amplifying said terminal voltage that has been adjusted by said thermistor according to said measured ambient temperature; and means for amplifying voltage that produces amplified voltage according to a voltage amplifying degree set by said voltage amplifying degree setting means and transmits a signal indicating such voltage amplification to said rotating speed control system.

3. A temperature-based cooling fan control structure as claimed in claim 1, wherein said means for setting fan rotating speed is composed of a rotating speed setting resistance and a rotating speed setting capacitor for setting a voltage needed by a basic fan rotating speed.

4. A temperature-based cooling fan control structure as claimed in claim 1, wherein said timing trigger capacitor is a variable capacitor that works according to a variable value of time interval set for it to periodically actuate said cooling fan to rotate when said cooling fan is temporarily stopped under an external force.

5. A temperature-based cooling fan control structure as claimed in claim 1, further comprising a rectification system composed of two forward diodes, such that a voltage source supplying voltage needed by coils, said thermistor, and said voltage amplification system in said cooling fan control structure flows through said two forward diodes of said rectification system to prevent extreme changes in voltage or current between two electrodes and thereby protects said coils, said voltage amplification system and said thermistor against burning out.

6. A temperature-based cooling fan control structure as claimed in claim 1, further comprising a voltage-stabilizing control system composed of two zener diodes for preventing electromagnetic noise during quick polar changes in said magnetic induction system.

7. A temperature-based cooling fan control structure as claimed in claim 5, wherein said voltage source supplies bias voltage via bias resistances to said magnetic induction system, said rotating speed control system, and said thermistor.

* * * * *